Patented July 14, 1931

1,814,420

UNITED STATES PATENT OFFICE

HANS TOCHTERMANN, OF MANNHEIM, AND CLAUS HEUCK, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF RUBBER

No Drawing. Application filed August 19, 1929, Serial No. 387,080, and in Germany September 5, 1928.

This invention relates to improvements in the manufacture and production of rubber or of polymerization products of diolefines, which are plastic or elastic or which possess both properties.

It is already known that rubber may be rendered stable for storing and resistant to the action of light and heat by the addition of preserving agents or agents for preventing ageing, as for example aldol-alpha-naphthylamine or other condensation products of acetaldehyde with aliphatic or aromatic amines, among others.

We have now found that polymerization products of diolefines, such as butadiene or isoprene which are plastic or elastic or which possess both properties are obtained in a condition particularly stable for storing when preserving agents, which expression includes agents for preventing ageing, are added in a dissolved or emulsified form, that is to say finely dispersed in a liquid, to the emulsions of one of the aforesaid polymerization products and from which said products are to be separated, either before or during the coagulation, that is to say at some time prior to the completion of the coagulation. As examples of such agents may be mentioned the condensation products of aldehydes, in particular aliphatic aldehydes with aromatic amines, such as aldol-alpha-naphthylamine, crotonealdehyde-naphthylamine, acetaldehyde aniline or phenyl-alpha-naphthylamine.

The aforesaid agents are usually added in comparatively small amounts, and as a rule in such amounts that 0.5 to 2 per cent thereof is present in the coagulated product. If the emulsion of one of said polymerization products has been thoroughly mixed with the solution or emulsion of the agents above referred to, these are present in the finished product after coagulation in a state of extremely fine and uniform dispersion. The polymerization products thus obtained remain entirely unchanged even after having been stored for long periods of time.

The process in accordance with the present invention may be carried out in a particularly advantageous manner by employing the emulsions of polymerization products prepared from butadiene or homologues thereof by polymerization in aqueous emulsions in the presence of wetting agents.

The coagulation is carried out according to any of the usual methods, for example by the addition of substances capable of setting up an acid reaction, by the action of enzymes, or by freezing out.

The following example will further illustrate the nature of this invention, but the invention is not restricted thereto. The parts are by weight.

*Example*

An emulsion of 5 parts of aldol-alpha-naphthylamine in 100 parts of water is introduced into an emulsion obtained by polymerization of an emulsion prepared from 200 parts of isoprene, 18 parts of olein or stearic acid, 17.5 parts of a 10 per cent solution of ammonia and 340 parts of water. A plastic and elastic product of great stability is obtained after coagulation.

The first mentioned emulsion is prepared by the introduction of an alcoholic solution of aldol-alpha-naphthylamine, which has been prepared hot, into water. An emulsion of the preserving agent having a good stability may also be prepared in the cold by stirring a solution of 1 part of aldol-alpha-naphthylamine in 5 parts of ethyl lactate with 15 parts of water. It is advantageous to add agents which reduce the surface tension such as soaps, saponines, aliphatic, hydroaromatic or aromatic sulphonic acids, for example alkylated naphtholic sulphonic acids and/or suitable protective colloids such as glue, agar-agar, gelatine amino acids, albumines, methyl or alkyl cellulose and the like to the emulsion of the preserving agent.

What we claim is:—

1. A process for the production of valuable plastic and elastic materials particularly stable for storing and proof against "ageing" from emulsions of polymerization products of diolefines, which comprises adding a preserving agent finely dispersed in a liquid to said emulsion from which the said polymerization product is to be coagulated, prior to the completion of the coagulation.

2. A process for the production of valuable plastic and elastic materials particularly stable for storing and proof against "ageing" from emulsions of polymerization products of diolefines, which comprises intimately mixing a preserving agent finely dispersed in a liquid with said emulsion from which the said polymerization product is to be coagulated, prior to the completion of the coagulation.

3. A process for the production of valuable plastic and elastic materials particularly stable for storing and proof against "ageing" from emulsions of polymerization products of diolefines, which comprises intimately mixing between about 0.5 and 2 per cent, based on the weight of the coagulated product, of a preserving agent finely dispersed in a liquid with said emulsion from which the said polymerization product is to be coagulated, prior to the completion of the coagulation.

4. A process for the production of valuable plastic and elastic materials particularly stable for storing and proof against "ageing" from emulsions of polymerization products of diolefines, which comprises adding a condensation product of an aldehyde finely dispersed in a liquid to said emulsion from which the said polymerization product is to be coagulated, prior to the completion of the coagulation.

5. A process for the production of valuable plastic and elastic materials particularly stable for storing and proof against "ageing" from emulsions of polymerization products of diolefines, which comprises intimately mixing a condensation product of an aldehyde with an aromatic amine, finely dispersed in a liquid, with said emulsion from which the said polymerization product is to be coagulated, prior to the completion of the coagulation.

6. A process for the production of valuable plastic and elastic materials particularly stable for storing and proof against "ageing" from emulsions of polymerization products of diolefines, which comprises intimately mixing aldol-alpha-naphthylamine in an emulsified state with a product prepared by the polymerization of isoprene in a state of emulsion, and coagulating.

7. As a new article of manufacture a polymerization product of a diolefine containing a preserving agent in such a degree of dispersion as can be obtained by adding the preserving agent finely dispersed in a liquid to an emulsion of a polymerization product of a diolefine prior to the completion of the coagulation of the latter emulsion.

8. As a new article of manufacture a polymerization product of a diolefine containing between 0.5 and 2 per cent of a preserving agent in such a degree of dispersion as can be obtained by adding the preserving agent finely dispersed in a liquid to an emulsion of a polymerization product of a diolefine prior to the completion of the coagulation of the latter emulsion.

9. As a new article of manufacture a polymerization product of a diolefine containing between 0.5 and 2 per cent of a condensation product of an aldehyde in such a degree of dispersion as can be obtained by adding the preserving agent finely dispersed in a liquid to an emulsion of a polymerization product of a diolefine prior to the completion of the coagulation of the latter emulsion.

10. As a new article of manufacture a polymerization product of a diolefine containing between 0.5 and 2 per cent of a condensation product of an aldehyde with an aromatic amine in such a degree of dispersion as can be obtained by adding the preserving agent finely dispersed in a liquid to an emulsion of a polymerization product of a diolefine prior to the completion of the coagulation of the latter emulsion.

11. As a new article of manufacture a polymerization product of a diolefine containing between 0.5 and 2 per cent of aldol-alpha-naphthylamine in such a degree of dispersion as can be obtained by adding the preserving agent finely dispersed in a liquid to an emulsion of a polymerization product of a diolefine prior to the completion of the coagulation of the latter emulsion.

In testimony whereof we have hereunto set out hands.

HANS TOCHTERMANN.
CLAUS HEUCK.